Figure 1:
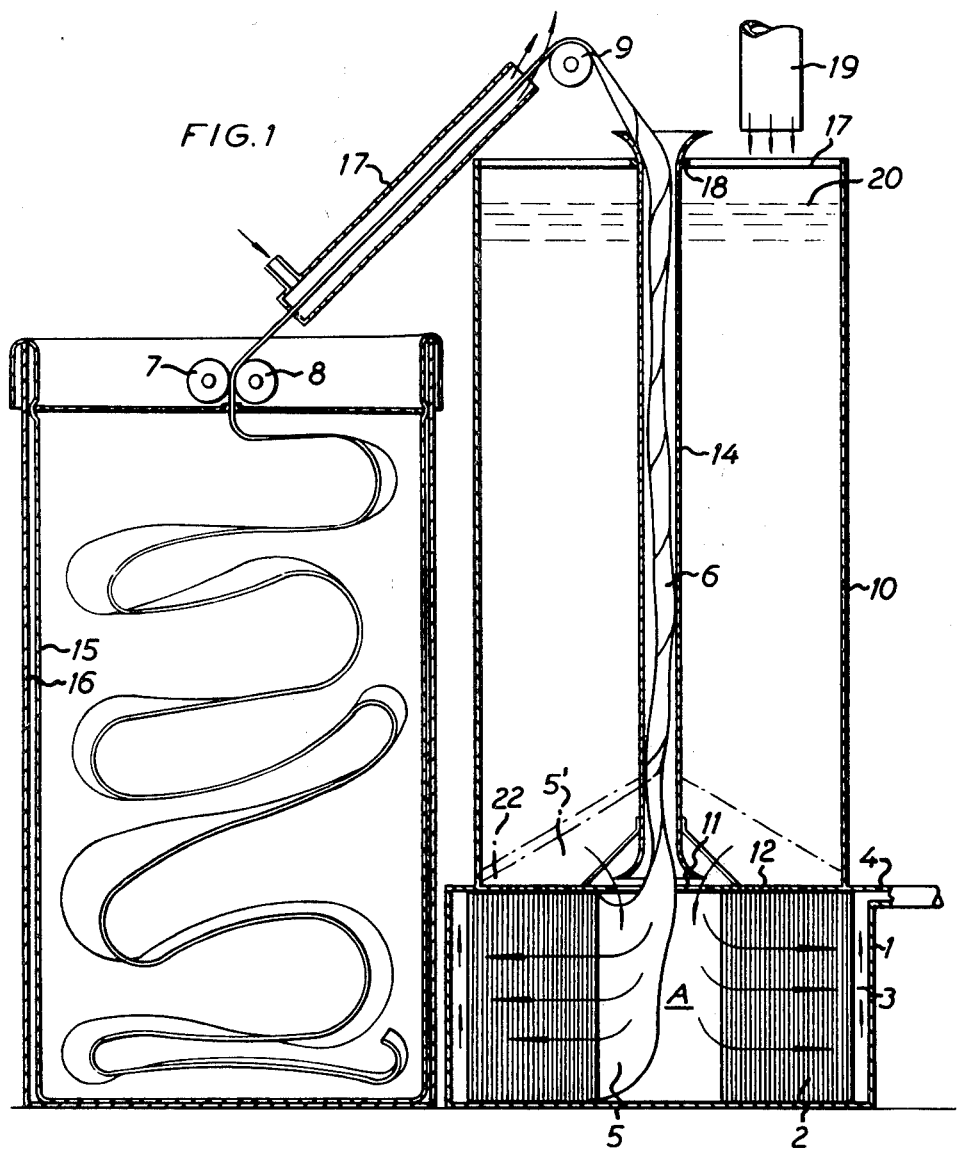

United States Patent [19]

Olsson et al.

[11] 4,131,546

[45] Dec. 26, 1978

[54] METHOD AND APPARATUS FOR REMOVING FILTERABLE SUBSTANCES FROM A LIQUID

[75] Inventors: Knut Å. G. Olsson, Lund; Karl P. E. Åström, Staffanstorp; Johan C. Johansson, Lund, all of Sweden

[73] Assignee: Ifö Sanitär AB, Bromölla, Sweden

[21] Appl. No.: 799,038

[22] Filed: May 20, 1977

[30] Foreign Application Priority Data

May 24, 1976 [SE] Sweden ................................ 7605850

[51] Int. Cl.² ............................................. B01D 33/00
[52] U.S. Cl. ........................................ 210/77; 210/79; 210/359; 210/407
[58] Field of Search .................. 210/77, 79, 160, 315, 210/342, 400, 401, 526, 359, 407; 162/295, 202, 292, 384; 198/819, 839

[56] References Cited

U.S. PATENT DOCUMENTS

| | | | |
|---|---|---|---|
| 2,796,810 | 6/1957 | Müller | 162/295 |
| 3,654,074 | 4/1972 | Jacquelin | 162/295 |
| 4,039,450 | 8/1977 | Brown | 210/400 |

*Primary Examiner*—Frank Sever
*Attorney, Agent, or Firm*—Beveridge, DeGrandi, Kline & Lunsford

[57] ABSTRACT

The disclosure relates to a method and apparatus for removing separable impurities from a liquid. In the method, the liquid is caused to pass radially through a cylindrical roll of web-like, wet-strength fiber material at the same time as the fiber web which forms the roll is continuously drawn out at low speed from the roll at that circumferential side where the liquid is caused to enter. As a result, the roll constantly offers a relatively clean surface to the penetrating liquid. The apparatus comprises a chamber for the roll, a conduit for conducting the liquid to the one circumferential side of the roll, a discharge for conveying off liquid from the vessel at the other side of the roll, rollers for guided withdrawal of the fiber web, and a receptacle for collecting the web withdrawn from the roll.

12 Claims, 2 Drawing Figures

U.S. Patent Dec. 26, 1978 Sheet 1 of 2 4,131,546

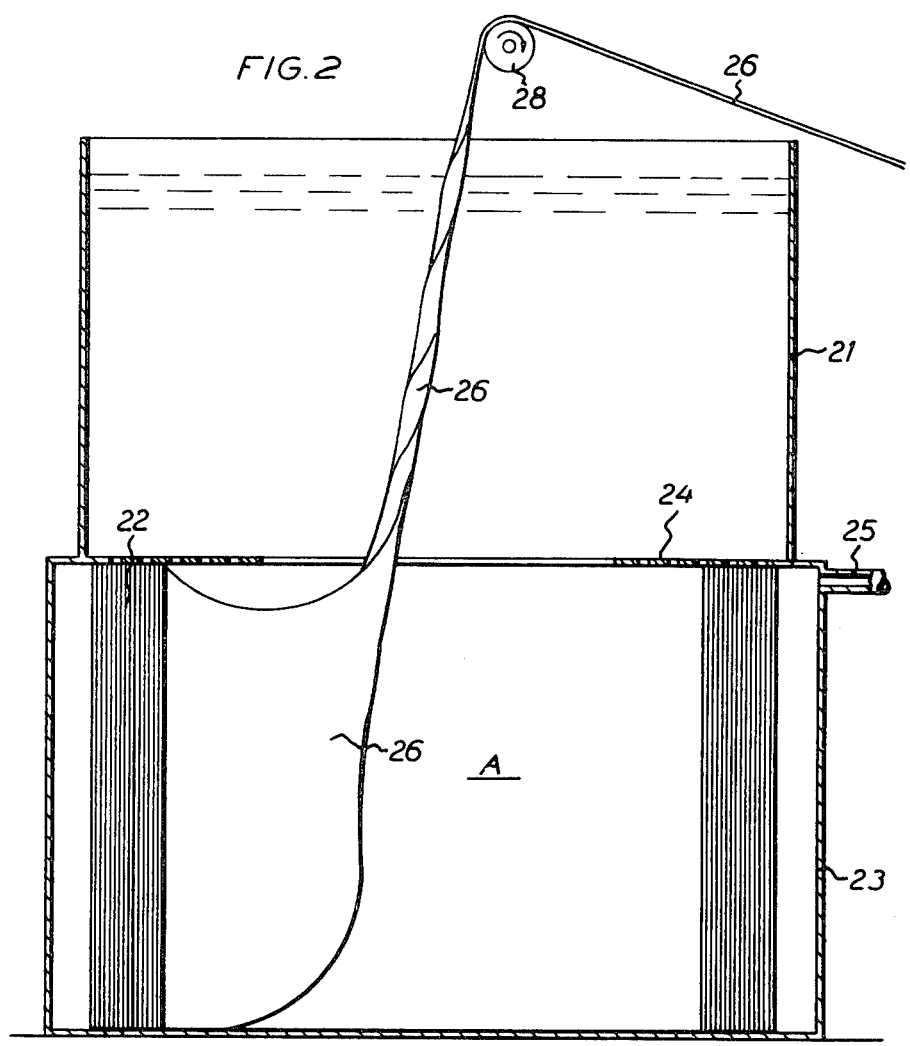

METHOD AND APPARATUS FOR REMOVING FILTERABLE SUBSTANCES FROM A LIQUID

The present invention relates to a method of removing separable impurities from a liquid, in particular solids, for example, sludge or fibers from slurries, but also, for example, oil from emulsions of water and oil.

Solids of different types can be removed from a liquid by conventional filtering, vacuum filtering, centrifugation etc. but rapid and effective industrial processes for the removal of solids from a liquid are unfortunately associated with high energy and economic demands and the separation equipment is expensive. For the removal of, for example, such solids as sludge formed by biological wet aerobic digestion of suspensions of waste in water from, for example, private households for the purification of the water, prior art advanced separation methods seem, at the time of writing, to be totally inconceivable for economic reasons.

The object of the present invention is to realize a simple, effective and cheap method of purifying liquids by separating primarily solids, for example, fibers or sludge particles, such as sludge formed by biological wet aerobic digestion of domestic waste (see for example Danish Patent Application Nos. 5144/74 and 443/76), or by separation of semi-solid or fluid substances, such as fat or oil from water in emulsions. More particularly however, the object of the present invention is to realize a simple and cheap but effective method of purifying a liquid which has a relatively high content of solid or semi-solid component parts. Another object of the present invention is wherever necessary to make possible the positive use of the solid matter removed from the liquid in the form of, for example, a dried sludge which derives from a process for wet aerobic digestion of domestic waste.

In the conventional filtering of a liquid which contains slurried solids through, for example, a paper filter, the filter will, as is well known, be rapidly choked to such an extent that the filter must for practical reasons be replaced after a short time by a new filter in order that the filtering process be able to continue. The problem inherent in the regular change of a filter in, for example, long-term sludge separation, without the need for manual filter change and without the use of advanced and expensive equipment has hitherto not been solved.

However, it is now proved that solids, for example, small particles which occur in digested sludge or sludge formed in a wet aerobic digestion process for sanitary treatment of domestic waste in water, or fibers (including very fine fibers, so-called micro-fibers) in water from the pulp and paper industries can, in a surprisingly simple, effective and cheap method, be separated by means of a specially arranged filter which has a very large total surface and may be removed in a unique way as it is used.

The method according to the invention for removing separable solids from a liquid, for example, sludge or fibers in slurries in a liquid or oil in an emulsion of water and oil, in which method the liquid is continuously or intermittently led through a fiber material, is characterized in that the liquid is caused to pass radially through a cylindrical roll of web-formed wet-strength fiber material, at the same time as the fiber web which forms the roll is continuously drawn at slow speed out from the roll at the circumferential side where the liquid is caused to enter, whereby the roll constantly offers a relatively clean surface to the penetrating liquid.

By drawing out the fiber web at only low speed from the innermost turn of the roll through the central cavity of the roll, for example, at a speed of about 1–100 cm/h, intermittently or continuously, the effect is achieved that the roll continuously exposes a relatively clean filtering surface to the liquid led to the roll for filtering, and that the roll has consequently optimum ability for a long period of time to collect solid component parts, apart from the effect that the roll has optimum permeability to the liquid which is being filtered. The optimum speed for removal of the fiber material may easily be determined taking into account the properties of the fiber material, the height, diameter and cavity diameter of the roll, the height of the water column above the roll or the pressure on the roll if only a positive filtering pressure is used, the concentration of the solid component parts in the liquid and, quite generally, the ability of the liquid to penetrate the fiber material roll.

When the fiber web with the substances collected from the liquid is drawn out from the central cavity of the fiber web roll, the web is for natural reasons twisted to form a spiral which, according to the invention, is utilized for retaining the collected substances on the inner sides of the spiral turns which previously formed the frontal surface of the roll for the collection of these substances.

Thus, the twisting moment of the fiber web is utilized and, moreover, its tendency to form as it moves further away from the roll a steadily tighter spiral for enclosing and "packaging" the substanced collected through the filtering process, the substances normally being solids but, as was previously mentioned, may be fat and oils but also other fluid or semi-fluid component parts, for example, lacquer. A suitable hydraulic pressure can be created for the purposes of the filtering process by causing the liquid to penetrate the fiber web via a liquid column of a certain height. Thus, the fiber web roll may be placed in a container which has an upper opening opposite the central cavity of the roll and, in conjunction with this central opening, a vessel of suitable height can be arranged for achieving the desired liquid pressure. The fiber web may according to the invention be drawn up through the vessel, but, for avoiding recycling of the connected substances from the spiral fiber web, the web is led through the vessel into a guide tube which extends through the liquid and up out of the vessel and in which the spiral fiber web slides during its removal. The guide tube which by suitable dimensioning may be used for determining the shape of the fiber web spiral (for example, such that the spiral itself assumes tubular shape and at least substantially fills out the guide tube) prevents the collected substances from being rinsed off and returning to the liquid in the vessel, which could well happen if the fiber web spiral were drawn up through the liquid. Because the guide tube is connected at its lower end to the central cavity in the fiber web roll, the guide tube will, under operation, be filled with liquid, but the tendency to rinsing off of collected solids to the liquid is totally eliminated (or will in any event be considerably less) since the recycling of such solids in a direction towards the central cavity of the roll must taken place in the longitudinal direction of the spiral and consequently against a relatively powerful resistance.

A traction roller pair placed outside the vessel can be used for removal of the spiral-shaped fiber web with the solids enclosed in the spiral. These rollers may have linings of elastic material, for example, rubber, for avoiding excess pressure on the spiral in the nip between the rollers and for avoiding pressing-out of the filtered-off material through the spiral, in particular at the edges of the spiral turn. The spiral is preferably fed down from the withdrawal apparatus into a collection vessel.

Since the spiral-shaped fiber web with the filtered-off substances enclosed in the spiral is drawn out from the fiber web roll and the vessel at a relatively low speed, the spiral may be air-dried, without great difficulty and without the aid of bulky apparatuses, to the desired level of dryness, for example from 90–100%, before collection of the consumed filter material with the collected substances. Naturally, if desired, accelerated drying may be achieved. The fiber web may possibly be enclosed in a hood or the like along a suitable distance between the vessel and the collection device.

Furthermore, it may be advantageous to disintegrate the discharged fiber web to fragments before or after collection. For example, the fiber web may be cut up to fragments by means of cutting rollers, or may be crushed or ripped by means of eccentric gear-wheels driven at different speeds. Finally, the fiber web may be dry-milled in a mill. such If the solids collected on the fiber material are sludge particles from, for example, wet aerobic digested domestic waste, pg,7 such as faeces and kitchen waste from households, which, during biological wet aerobic digestion have been brought to such a condition that they form a hygienically harmless sludge in the water, paper fibers may be used as the fiber material in which case the end product, that is to say, the fiber web with the collected sludge, may be used as a soil improver.

The present invention and its aspects will be more readily understood from the following description of the drawings, and discussion relating thereto.

In the accompanying drawings:

FIG. 1 shows a preferred embodiment of a filtering mechanism according to the invention for carrying out the method of the present invention; and FIG. 2 shows a filtering apparatus according to the invention which has been modified as regards dimensions and, in particular, dimension ratios.

The apparatus shown in FIG. 1 includes substantially a container or vessel 1 which forms a filter chamber and contains a filter material in the form of a fiber web roll 2 which displays a central cavity A. Liquid which is to be filtered is introduced, under a certain pressure, into the central cavity A of the fiber web roll 2 so that the liquid is caused to penetrate radially outwardly in a direction towards the periphery of the fiber web roll, where the liquid is collected in a gap 3 and led out through an outlet 4 which is disposed in the upper region of the filter chamber 1.

During the filtering, the fiber web 5 is always withdrawn from the innermost turn of the roll 2 and, under the withdrawal action, the fiber web is caused to form a spiral 6 which, a distance above the filter chamber 1, forms a closed tube of filtering material. The spiral-shaped fiber web is drawn out from the roll 2 by means of a traction apparatus which, in the present case, consists of a pair of traction rollers 7, 8 of which at least one is disposed to be driven. These traction rollers 7, 8 are preferably provided with elastic linings, for example, of relatively soft rubber. A guide roller 9 or, if necessary, several guide rollers may be disposed ahead of both of the traction rollers.

A reservoir 10 may be disposed above the filter chamber or vessel 1 for realizing suitable hydraulic pressure. In this reservoir, the liquid which is to be filtered is maintained constantly at a predetermined level, the liquid being supplied to the reservoir 10 at substantially the same rate as the filtered liquid is led off through the outlet 4.

The reservoir 10 is preferably separated from the filter vessel 1 by means of a partition in the form of a plate 12 which displays a central hole 11 opposite the central cavity A of the fiber web roll 2.

As is shown on the drawing, the plate 12 supports a tube 14 which extends centrally upwardly through the reservoir 10 and reaches up above the reservoir for guiding the withdrawn fiber web in its spiral-shaped portion 6. The guide roller 9 is mounted above the guide tube and the spiral-shaped web (flattened out by the guide roller) extends from the guide roller 9 to the traction roller pair 7, 8, whence the web is transferred to a sack 15 which is supported in a container 16 which may, for example, be in the form of a vessel.

The paper web may be dried in the region between the guide roller 9 and the traction rollers 7, 8. Since the paper web is drawn slowly by means of the traction rollers 7, 8, the drying may be effected in the ambient air, but if desired, accelerated drying may be achieved, for example, in a drying cabinet 17 as shown on the drawing.

If desired, the fiber web 5 may, instead of being withdrawn from the inner circumference of the roll 2, be withdrawn from the outer circumference of the roll. In this case, the guide tube 14 may be placed at the periphery of the reservoir 10 or possibly outside the reservoir 10. In such a filtering operation which is effected radially from the outside and inwardly, the liquid is introduced in the gap 3 and the outlet 4 is connected to the central cavity A instead of to the column. When the fiber web is drawn out from the outer periphery of the roller 2 the fiber web also quite naturally forms a spiral, although in this case the outer side of the spiral is formed of that side of the fiber web which, with the roll 2, is turned against the direction of the liquid entering to be filtered. However, in this case, each upper turn of the spiral is overlapped by the lower turn in the spiral so that material running downwardly is led into the spiral.

In FIG. 1, the above-described modifications, that is to say the withdrawal of the fiber web from the outer circumference of the roll and withdrawal of the filtered liquid from the inner cavity of the roll are intimated by means of dash-dot lines.

In FIG. 2 is suggested the possibility of using large fiber material rolls for filtering great amounts of water, for example, in the pulp and paper industries for fiber separation from waste water, with the possibility of recovering the fibers in that a paper fiber web can be used as the fiber web, which, together with the fibers collected during the filtering operation, may be recycled to the pulp or paper production process.

In FIG. 2, use is made of the same reference numerals as in FIG. 1 for equivalent parts but with the addition of figure "2" in front of the reference numerals used in FIG. 1.

A few examples are given below of practical fields of use of the present invention and the apparatus shown on the drawings.

EXAMPLE 1

From a plant for wet aerobic digestion of domestic waste, such a faeces and disintegrated kitchen waste collected in water, a suspension consisting of water and the sludge formed by the biological wet aerobic digestion process is led intermittently to the reservoir 10 in FIG. 1 for filtering. The reservoir 10 had a height of 1 m and a volume of 100 l and the container 1 was of sufficient dimensions for accommodating a roll 2 which initially had a diameter of 40 cm and a height of 30 cm. The central cavity A had initially a diameter of 12 cm and the thickness of the roll, measured from the inside to the outside, was thus 14 cm. The gap 3 about the roll 2 was sufficient for reception of the filtered water which was led out through the outlet 4. As an example, it might be mentioned that the water, which was heavily clouded by solid sludge particles, had a biological oxygen consumption for seven days ($BS_7$) of 70 mg/l, a total phosphorus content (tot-P) of 5.2 mg/l and a dry solids content (TS-content) of 0.6%. The roll 2 consisted of wet-strength fiber material and both material of cellulose fibers and polypropene fibers were used. I this case, use was made of an apparatus of the type shown in FIG. 2, in which the filter chamber 1 itself could be connected in liquid-tight fashion to the lower end of the reservoir 10 by means of a suitable device, such as a simple bayonet clutch (not shown), the partition 12 shown in FIG. 1 between the chamber 1 and the reservoir 10 being at its outer edge sealed off in relation to the reservoir 10 and the chamber 1.

At this point, mention might be made of the fact that for the bottom partition 12, use can be made of a plate which displays the above-described central hole and is connected to the tube 14 or a plate connected to the reservoir 10 or the chamber 1 and forming the bottom wall in the reservoir 10 or a tight lid to the chamber 1, in which case the tube 6 should be supported on the plate 12 or be able to be connected at its lower end to the plate 12. At its upper end, the tube 14 is supported by means of a spider 18 and a central ring 19.

The liquid which was to be filtered was introduced into the reservoir 10 by means of a supply conduit 20 and in the reservoir, the liquid was maintained at a predetermined level 21 for the major part of the filter cycle.

The liquid in the reservoir 10 had free access to the central cavity A through the opening 11 and penetrated through the roll 2 in the manner suggested by means of arrows in FIG. 1 to the collection gap 3 whence the filtered liquid was led off through the outlet 4. The outlet 4 was placed at the upper edge of the filter chamber 1 immediately beneath the plate 12 for ensuring that the entire roll 2 was totally immersed in water and did not dry out.

The fiber web 5 was withdrawn from the inner circumference of the roll through the central cavity A and up through the guide tube 14 at a speed of 0.1 m/h by means of the withdrawal apparatus 7, 8. As suggested in FIG. 1, the fiber web 5 was already twisted in the cavity A to the form of a spiral and as distance increased from the roll 2, this spiral developed more and more into the shape of an enclosed tube 6. The guide tube 14 prevented the sludge particles collected by the fiber web and enclosed in the spiral 6 from being rinsed off and returned to the liquid in the reservoir 10. The guide tube 14 was naturally filled with water from the cavity A but because of the careful, slow withdrawal of the fiber web 5 from the roll, the sludge particles were retained and, as soon as the spiral merged to tubular shape, the sludge particles were "packaged" in the spiral. Rinsing of sludge particles in the tube 14 was thus prevented by the spiral itself, since conveying off of sludge particles with liquid must take place in the longitudinal direction of the spiral in which the resistance against conveying off of sludge particles is great. Consequently, the spiral formed an effective barrier against recycling of sludge particles to the unfiltered liquid.

The spiral 6 with the sludge particles enclosed therein was air-dried on its way between the guide roller 9 and the traction roller pair 7, 8 and was inserted by means of the traction roller pair into the sack 15 for packaging.

When a cellulose fiber web was used, the filter material utilized could, together with the filtered-off sludge, be made use of as a valuable soil improver. The dry contant could without difficulty be maintained at 90% by normal air drying but could also easily be pushed up to 100%. The purified water amount was 800 l/day at $BS^7 = 4$ mg/l and tot-P=0,07 mg/l.

EXAMPLE 2

Waste water with a high fiber content, such as 320 mg/l from the pulp industry was led into a filter apparatus of the same type as that shown in FIG. 1 and described in Example 1, but with a larger filter chamber, as shown in FIG. 2. The chamber 21 and reservoir 23 each had a volume of 10 $m^3$. The roll 22 which consisted of wet-strength cellulose fiber material and weighed approximately 1 ton, had an outer diameter of 3 m, an inner diameter of 2.5 m and a height of 1.6 m. The thickness of the roll, that is to say, half of the distance between its inner and outer diameters, was, thus, initially only 0.25 m. In continuous operation and at an advancement speed of 1 m/h, the roll can nevertheless be used for about 12 months before replacement becomes necessary.

The amount of purified water with a fiber content of approximately 0 mg/l was about 124 $m^3$/day.

EXAMPLE 3

In different experiments, water with a sludge concentration of about 2% was led from a treatment plant for biological and chemical purification treatment to the filter apparatus described in Example 2. The TS-content of the filtered sludge increased from 2% to 60%. The fiber material was advanced at a speed of 10 m/h and the sludge was dried only to a slight extent. The treated waste water amount was about 96 $m^3$/day. The filter material with sludge collected therein was milled and composted. For good composting effect, sludge from a waste water treatment plant requires an addition of a carbon source, for example, peat-moss, sawdust and bark. However, in the present process, there is already a sufficient amount of a cheap carbon source in the filtered-off sludge, namely the cellulose fibers in the filter material utilized, for which reason no special addition of carbon source was necessary for good composting.

EXAMPLE 4

A mixture of oil and water was led into the filter apparatus described in Example 1. The filter material was produced from polystyrene fibers. This filtering material is hydrophobic and oleophilic and sucks up the oil but allows the water to pass through. The absorbed oil was pressed out from the consumed filter material which was removed in the manner according to the invention from the filter chamber by means of a pair of rollers. This was carried out in such a manner that the consumed filter material was "despiraled", that is to say returned to planar web form, likely pressed and wound up on a cylindrical core or reel, whereupon the roll could be reused in the filter apparatus.

Apart from the above-described modifications in relation to the apparatus shown in FIGS. 1 and 2, further modifications are possible. It is, for example, possible to introduce the liquid, which is to be filtered, through a conduit. The only real problem is how the fiber web 5 twisted into spiral-shape is to be disposed for avoiding the risk that the liquid be pressed out through the guide tube. If the liquid is introduced, in the apparatus in FIG. 1, at the outer circumference of the roll 2, that is to say if the liquid is led into the gap 3, the liquid may be led in directly by means of a conduit (in which case the reservoir 10 may be dispensed with, if so desired). In this case, the guide tube 14 can, as shown in FIG. 1, be provided with a funnel-like discharge opening 5' which, in relation to the roll 2, has an open peripheral gap 22. This gap should then be in communication with the roll 2 around the entire circumference of the plate 12 for permitting free unrolling of the fiber web from the outer circumference of the roll.

According to a further modification, the roll may be placed with an inclined or quite simply horizontal axis.

What we claim and desire to secure by Letters Patent is:

1. Method for removing filterable substances from a liquid, for example, sludge, or fibers in slurries in a liquid or oil in an emulsion of oil and water, in which method the liquid is continuously or intermittently led through a fiber material, wherein the liquid is caused to pass radially through a cylindrical roll of web-like, wet-strength fiber material at the same time as the fiber web which forms the roll is continuously drawn out at a sufficiently low speed from the roll in a spiral tube which retains said substances therewithin, while continuously renewing the filtration surface of said roll.

2. The method as recited in claim 1, wherein the roll displays a central cavity and wherein the liquid which is to be filtered is introduced into the central cavity and, after filtering, is led off at the outer circumference of the roll.

3. The method as recited in claim 2, wherein the fiber web is withdrawn from the roll such that the web in a natural or artificial manner is formed into a spiral which encloses the substances collected on the web.

4. The method as recited in claim 3, wherein the spiralshaped fiber web is, during withdrawal, led through a guide tube into a vessel via which the liquid which is to be filtered is led to the one circumferential surface of the roll and by means of which separated substances collected on the fiber web surface are prevented from being rinsed off and returned to the liquid in the vessel.

5. The method as recited in claim 1, wherein the fiber web slowly withdrawn from the roll is led to and collected in a vessel.

6. The method as recited in claim 5, wherein the fiber web, prior to collection in the vessel, is disintegrated into fragments by being torn, cut or milled.

7. The method as recited in claim 5, wherein the fiber web, after collection in the vessel, is disintegrated into fragments by being torn, cut or milled.

8. The method as recited in claim 5, wherein the fiber web is air-dried prior to said collection.

9. The method as recited in claim 1, in which the liquid is an emulsion of oil in water and the substances collected by the fiber web at the inner circumference of the roll are to a substantial degree oil, wherein the oil, after withdrawal of the fiber web from the vessel, is pressed out of the fiber web which is thereafter collected in the form of a roll for reuse.

10. The method as recited in claim 9, wherein the fiber web is air-dried prior to said collection.

11. Apparatus for filtering a liquid, comprising a chamber with a roll mounted in the chamber, the roll consisting of a web of wet-strength fiber material with filtering properties and having a central cavity means which is defined by the innermost fiber web turn of the roll, means for conducting liquid to be filtered to the one circumferential side of the roll, means for conveying off liquid from the vessel at the other circumferential side of the roll, means for guided withdrawal of the fiber web from said one circumferential side of the roll to form a filter which retains filterable web spiral tube means substances removed from said liquid therewithin, and means for collecting the fiber web withdrawn from the roll.

12. The apparatus as recited in claim 11, wherein said one circumferential side of the roll is the inner circumferential side of the roll which defines the central cavity, and wherein the other circumferential side of the roll is the outer circumferential side thereof.

* * * * *